United States Patent [19]
DeViney et al.

[11] 3,755,712
[45] Aug. 28, 1973

[54] FAULT PROTECTION FOR DC MOTOR THYRISTOR POWER SUPPLIES

[75] Inventors: Terrence E. DeViney, Seven Hills; Robert P. Brennan, Bedford Heights, both of Ohio

[73] Assignee: Square D Company, Park Ridge, Ill.

[22] Filed: Sept. 7, 1972

[21] Appl. No.: 287,146

[52] U.S. Cl. ............ 317/13 R, 317/33 SC, 318/375, 318/378, 321/14
[51] Int. Cl. ............................................. H02h 7/14
[58] Field of Search ...................... 317/33 SC, 13 R; 318/375, 376, 377, 378, 379; 322/28; 321/18, 11, 14, 27

[56] References Cited
UNITED STATES PATENTS 3,590,323  6/1971  Mapham et al. .................. 321/14 X
3,657,625  4/1972  Miller et al. ..................... 318/376 X Primary Examiner—James D. Trammell
Attorney—Harold J. Rathbun et al.

[57] ABSTRACT

In a regenerative DC motor control, a line voltage failure during regeneration ordinarily results in a fault current of sufficient magnitude to damage any conducting thyristors or their protective fuses. To prevent such damage, a gate suppression circuit operates upon occurrence of a fault to prevent further firing of thyristors. A fault protection module controls the connection of a charged capacitor across the then-conducting thyristors at a predetermined time after the fault to permit resetting of those thyristors and prevent any damage to thyristors or fuses.

7 Claims, 3 Drawing Figures

3,755,712

FAULT PROTECTION FOR DC MOTOR THYRISTOR POWER SUPPLIES

This invention relates to regenerative thyristor control systems for DC motors, and more particularly to a fault protection system for preventing damage to thyristors or their associated fuses upon occurrence of a line failure when a DC motor is operating in a regenerative mode.

The use of both single phase and three phase thyristor bridges to provide adjustable voltage control of DC motors is well known. It is also known to use a dual converter to form a regenerative motor control system, that is, a system wherein stored energy may be returned to the primary power supply by a motor while the motor is slowing down or operating under an overhauling load.

When a DC motor, powered by alternating current supplied by a transformer and rectified by a dual converter, is operated in a regenerative mode, opposition to motor voltage during regeneration is provided by the voltage at the secondary winding of the transformer. If a line failure occurs during regenerative operation, only the reactance of the transformer opposes the regenerated voltage and a high current fault quickly occurs causing damage to conducting thyristors or their associated fuses. Prior art control schemes have included gate pulse suppression circuits which, upon occurrence of a line failure, prevent further gate pulses from being applied to any of the thyristors in both thyristor bridges. However, no provision has heretofore been made in such prior art control systems for preventing damage to the thyristors, or associated fuses, which are conducting at the time the line failure occurs.

Accordingly, such a line failure has generally resulted in blowing of the two fuses related to the then-conducting thyristors so that replacement must be made before further operation of the motor is possible. This replacement generally results in a downtime of about five to ten minutes. Although this extensive downtime is very undesirable, it has been generally believed that protection of the thyristors that are conducting at the time of the line failure, and their associated fuses, could not be provided.

It is an object of this invention to provide a regenerative thyristor bridge control system for a DC motor which prevents damage to all thyristors and their associated fuses upon occurrence of a line failure during regenerative operation of the motor.

This and other objects and advantages of the present invention will become apparent from the specification when read in conjunction with the appended drawings, wherein.

Figure 1:
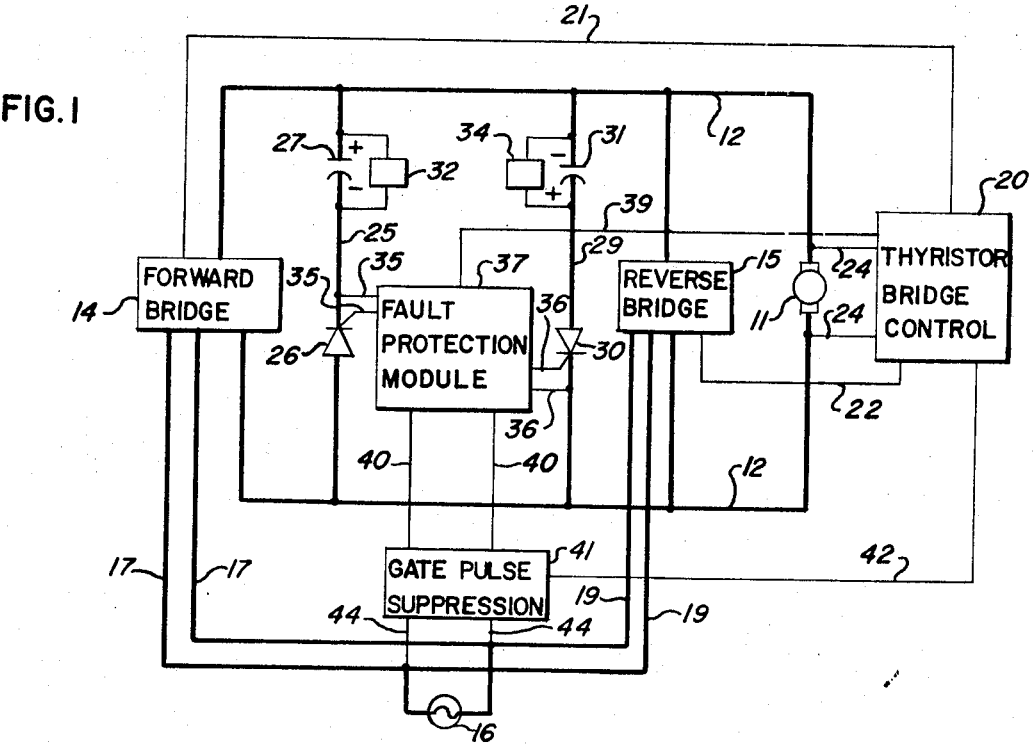
FIG. 1 is a block diagram, partially in schematic form, of a motor control system incorporating the fault protection means of the present invention.

Referring now to FIG. 1, a motor control system is illustrated for controlling the energization of an armature 11 of a DC motor, which may be a series, shunt, or compound machine, the field winding or windings of which are not shown. The armature 11 is selectively energized through a pair of conductors 12 by one of a pair of AC-DC converters which are shown as a forward thyristor bridge 14 and a reverse thyristor bridge 15. The forward bridge 14 controls operation of the armature 11 in one direction of rotation and the reverse bridge 15 controls operation of the armature 11 in another direction of rotation. The thyristor bridges 14 and 15 may be single-phase or three-phase but must be in a form which does not include a free wheeling diode.

Energization of the forward bridge 14 and reverse bridge 15 is provided by an alternating current source 16 through conductors 17 and conductors 19, respectively. The controlled conduction means or thyristors of the forward bridge 14 are gated on by voltage pulses provided by a thyristor bridge control system 20 through a set of conductors 21, and those of the reverse bridge 15 are gated on by the thyristor bridge control system 20 through a set of conductors 22. The thyristor bridge control system 20 controls the operation of the forward bridge 14 and reverse bridge 15 in accordance with the relationship a reference voltage bears to the voltage across, and the current through, the armature 11 which values are transmitted to the thyristor bridge control system 20 through conductors 24.

Serially connected across the forward bridge 14 by a conductor 25 are a forward protective thyristor 26 and an energy storage means, such as a capacitor 27, and serially connected across the reverse bridge 15 by a conductor 29 are a reverse protective thyristor 30 and a capacitor 31. Power supplies 32 and 34 are connected across the capacitors 27 and 31, respectively, for charging the capacitors in a manner to be described.

Firing of the thyristors 26 and 30 is controlled through conductors 35 and 36, respectively, by a fault protection module 37. The fault protection module 37 is connected to the thyristor bridge control system 20 by a conductor 39 and is connected by conductors 40 to a gate pulse suppression circuit 41 which cuts off the output of firing circuits in the thyristor bridge control system 20 through a conductor 42 to terminate the firing of thyristors in the bridges 14 and 15 upon occurrence of a line failure in a manner familiar to those skilled in the art. The gate pulse suppression circuit 41 is energized by connection to the alternating current source 16 by conductors 44.

Figure 2:
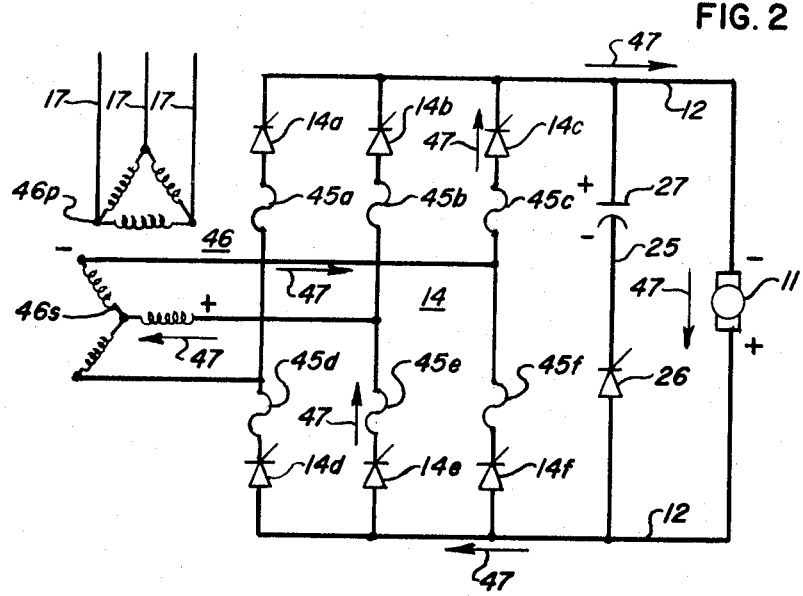
FIG. 2 is a schematic diagram of a portion of the motor control system of FIG. 1 illustrating operation of the fault protection means of the present invention.

FIG. 2 shows the armature 11 connected to a three-phase embodiment of the forward bridge 14 with the forward protective thyristor 26 and capacitor 27 connected thereacross. The forward bridge 14 comprises thyristors 14a–f connected in a manner well known to those skilled in the art with fuses 45a–f respectively connected serially therewith. Power is provided to the forward bridge 14 from a secondary winding 46s of a transformer 46 which has a primary winding 46p connected to the source of alternating current (not shown) by the conductors 17.

Operation of the circuit of FIGS. 1 and 2 will now be described. The forward bridge 14 and reverse bridge 15 convert alternating current from the AC source 16 to pulsating direct current which is carried by the conductors 12 to the armature 11. The effective magnitude of the voltage across the armature 11 is determined by the duration of the firing pulses which is, in turn, controlled by the thyristor bridge control system 20.

Upon occurrence of a loss of line voltage applied to the transformer primary winding 46p, hereinafter referred to as a line failure, the termination of alternating current supplied to the gate pulse suppression circuit 41 causes that circuit, through the conductor 42, to lock out the firing circuits in the thyristor bridge control system 20 so that gating pulses to the forward bridge 14 and to the reverse bridge 15 are terminated in a well known manner.

Although no further firing of thyristors can occur, if the motor is operating in a regenerative mode, the current through the two thyristors which are conducting at the time of the line failure will carry currents of extremely high magnitude if not turned off. In accordance with this invention, the termination of applied voltage from the gate pulse suppression circuit 41 through the conductors 40 to the fault protection module 37 causes a gating pulse to be applied to either the forward protective thyristor 26 or the reverse protective thyristor 30. The thyristor to be gated is determined by the fault protection module 37 in response to a signal applied through the conductor 39 from the thyristor bridge control system 20. This signal has one polarity if, at the time of the line failure, energization of the motor is being controlled by the forward bridge 14 and another polarity if the motor is being controlled by the reverse bridge 15. The firing of the thyristors 26 or 30 connects the capacitors 27 or 31, selectively, across the armature 11. Prior to the firing of the thyristors, however, the capacitors 27 and 31 are charged by the power supplies 32 and 34, respectively, to a predetermined voltage level with polarities as shown in FIG. 1.

If we assume, by way of example, that a line failure occurs during regenerative operation of the motor while it is being controlled by the forward bridge 14, the operative circuitry is that illustrated in FIG. 2. In a regenerative mode, the motor functions as a source of energy or generator so that the voltage across the armature has the polarity illustrated. Although the protective system of this invention would function equally effectively regardless of the pair of thyristors operating at the occurrence of the line failure, we will assume, for the purposes of this example, that motor current is being conducted through thyristors 14e and 14c with the voltage of the transformer secondary winding 46s having a polarity as shown in FIG. 2 so that the regenerative motor current path is as illustrated by arrows 47 and is opposed by the voltage across the transformer secondary winding 46s.

Upon occurrence of a line failure, voltage supplied to the transformer primary winding 46p through the conductors 17 terminates and the voltage across the transformer secondary winding 46s collapses, whereupon, there being no opposition to the voltage generated across the armature 11, a high current fault occurs which causes the fuses 45c and 45e to blow. As previously described with reference to FIG. 1, damage to the fuses associated with the other thyristors of the forward bridge 14 is prevented by operation of the gate pulse suppression circuit 41.

We have discovered that, for a brief period after the occurrence of a line failure, the current through the transformer secondary winding 46s is reduced to the magnetizing current of the transformer. This is caused by the loss of current in the primary winding 46p and the fact that the current and voltage characteristics of the secondary winding 46s will adjust in an attempt to keep the flux in the transformer from changing. Thus, during this brief period, the current through the circuit to be protected drops to a sufficiently low magnitude so that the then-conducting thyristors may be turned off.

At a predetermined time after the occurrence of the line failure, the forward protective thyristor 26 is fired in a manner to be described in detail with reference to FIG. 3. The thyristor 26 must be fired after the current through the secondary winding 46s has dropped to the magnetizing current of the transformer but a sufficient time before this current level is capable of increasing due to the voltage generated across the armature 11, to a fault current level. During this time, the thyristors 14c and 14e can be reset.

The capacitor 27 has previously been charged by the power supply 32, as shown in FIG. 1, with a polarity as indicated in FIG. 2 so that when the forward protective thyristor 26 is fired, the capacitor discharges and the current through the armature 11 is diverted to a path through the thyristor 26 and the capacitor 27. In this manner, current flow through the thyristors 14c and 14e is terminated and the thyristors reset. It is, therefore, readily apparent that the preset voltage across the capacitor 27 must be of sufficient magnitude that the pre-set voltage across the capacitor 27 maintains the polarity shown in FIG. 2 for a time sufficient to allow the thyristors to reset.

After the thyristors 14c and 14e have been reset, the forward protective thyristor continues to conduct current from the armature 11 and the capacitor 27 becomes charged with a polarity opposite that shown in FIG. 2, whereupon the forward protective thyristor 26 is reverse biased and resets. In this manner, damage to circuit thyristors and their associated fuses upon occurrence of a line failure is prevented.

It should be readily apparent that the above description of operation of the forward protective thyristor 26 and capacitor 27 with respect to the forward bridge 14 is equally applicable to the reverse protective thyristor 30 and the capacitor 31 with respect to the reverse bridge 15.

Figure 3:
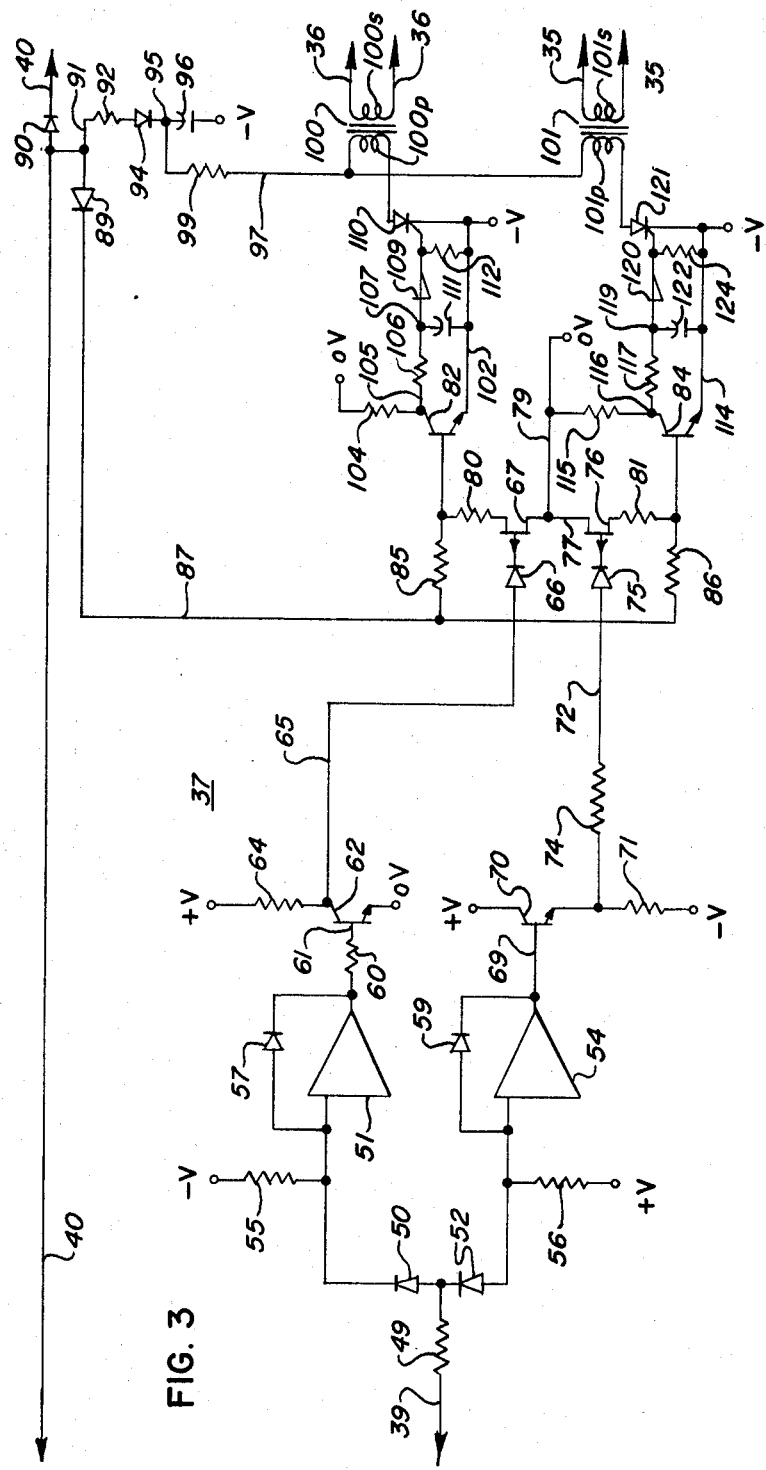
FIG. 3 is a schematic diagram of a fault protection module of FIG. 1.

Referring now to FIG. 3, a preferred embodiment of the fault protection module 37 of FIG. 1 is illustrated and is shown as externally connected to the gate pulse suppression circuit 41 by the conductors 40, to the thyristor bridge control system 20 by the conductor 39, and to the forward protective thyristor 26 and the reverse protective thyristor 30 by the conductors 35 and 36, respectively.

The conductor 39 is connected through a resistor 49 to a junction between a diode 50, poled to allow positive input voltages to be applied to an inverting operational amplifier 51, and a diode 52, poled to allow negative input voltages to be applied to an inverting operational amplifier 54. A negative biasing input voltage is applied to an input terminal of the amplifier 51 through a resistor 55 and a positive biasing input voltage is applied to an input terminal of the amplifier 54 through a resistor 56. Diodes 57 and 59 are connected across the amplifiers 51 and 54, respectively.

An output terminal of the amplifier 51 is connected through a resistor 60 by a conductor 61 to the base of a transistor 62 which has its emitter maintained at zero voltage. The collector of the transistor 62 is connected through a resistor 64 to a positive voltage source and by a conductor 65 through a diode 66 to the gate of a field effect transistor 67.

A conductor 69 connects an output terminal of the amplifier 54 to the base of a transistor 70 which has its collector connected to a source of positive voltage. The emitter of the transistor 70 is connected through a resistor 71 to a source of negative voltage and by a conductor 72 through a resistor 74 and a diode 75 to the gate of a field effect transistor 76.

The sources of the field effect transistors 67 and 76 are connected to each other by a conductor 77 and, by a conductor 79, to a point of zero voltage. The drains of the field effect transistors 67 and 76 are connected through resistors 80 and 81 to the bases of transistors 82 and 84, respectively. The bases of the transistors 82 and 84 are connected through resistors 85 and 86, respectively, to a conductor 87 which is connected through a diode 89 to the power supply conductor 40, the conductor 40 having a diode 90 interposed therein. A conductor 91 connects the diode 89 through a resistor 92, a diode 94, a junction 95 and a storage capacitor 96 to a source of negative voltage. The junction 95 is connected by a conductor 97 through a resistor 99 to one side of a primary winding 100p of a transformer 100 and to one side of a primary winding 101p of a transformer 101. A secondary winding 100s of the transformer 100 is connected to the reverse protective thyristor 30 through conductors 36. A secondary winding 101s of the transformer 101 is connected to the forward protective thyristor 26 through conductors 35.

The emitter of the transistor 82 is connected to a source of negative voltage by a conductor 102. The collector of the transistor 82 is connected to a point of zero voltage through a resistor 104 and by a conductor 105 through a resistor 106, a junction 107 and a threshold device, such as a unilateral switch 109, to the gate of a thyristor 110. The anode of the thyristor 110 is connected to another side of the transformer primary winding 100p; the cathode of the thyristor 110 is connected to a source of negative voltage. A capacitor 111 is connected between the junction 107 and the conductor 102 and a resistor 112 is connected between the gate of the thyristor 110 and the conductor 102.

The emitter of the transistor 84 is connected to a source of negative voltage by a conductor 114. The collector of the transistor 84 is connected through a resistor 115 to a point of zero voltage and by a conductor 116 through a resistor 117, a junction 119, and a threshold device, such as a unilateral switch 120, to the gate of a thyristor 121. The anode of the thyristor 121 is connected to another side of the transformer primary winding 101p, and the cathode of the thyristor 121 is connected to a source of negative voltage. A capacitor 122 is connected between the junction 119 and the conductor 114. A resistor 124 is connected between the gate of the thyristor 121 and the conductor 114.

Operation of the fault protection module 37 will now be described. The conductors 40 from the gate pulse suppression circuit 41 serve as a power supply for the fault protection module 37 and provide a positive input voltage which charges the capacitor 96 through the resistor 92 and diode 94 to a predetermined voltage level. The diode 94 prevents discharging of the capacitor 96. Additionally, the voltage provided through the conductor 40 is applied through the diode 89, conductor 87, and resistors 85 and 86, respectively, to bias the transistors 82 and 84 into conduction.

Proper operation of the fault protection module 37 requires that, upon occurrence of a line failure, only the protective thyristor associated with the then-conducting thyristor bridge be fired. If the forward bridge 14 is controlling motor energization, only the forward protective thyristor 26 must be fired; if the reverse bridge 15 is controlling motor energization, only the reverse protective thyristor 30 must be fired. Accordingly, a voltage signal is transmitted from the thyristor bridge control system 20 to the fault protection module 37 via the conductor 39. The polarity of this signal depends upon the polarity of the voltage across the aramture 11 and, accordingly, indicates which of the thyristor bridges is controlling regenerative operation of the armature 11.

In the preferred embodiment, during forward operation of the motor, the thyristor bridge control system 20 applied a negative voltage to the fault protection module 37 via the conductor 39 and, during reverse operation of the motor, the thyristor bridge control system 20 applied a positive voltage to the fault protection module 37 via the conductor 39. This voltage is applied through the resistor 49 to the junction between the diodes 50 and 52. If the applied voltage is positive, it is applied through the diode 50 to the amplifier 51 and blocked by the diode 52. If the voltage is negative, it is applied through the diode 52 to the amplifier 54 and blocked by the diode 50.

In the absence of a voltage input to the amplifier 51 through the diode 50, only a negative biasing voltage, applied through the resistor 55, is applied to the input terminal of the inverting amplifier 51. This voltage causes the amplifier to produce a positive output voltage which is, in turn, applied through the resistor 60 to the base of the transistor 62. This biasing voltage causes the transistor 62 to conduct and connects the gate of the field effect transistor 67 to the point of zero voltage so that the field effect transistor 67 is turned on.

In the absence of a voltage input to the amplifier 54 through the diode 52, only a positive voltage is applied to the input terminal of the amplifier 54 through the resistor 56. This input voltage attempts to drive the output of the amplifier 54 negative. However, the poling of the diode 59 limits the negative output voltage of the amplifier 54 to a very low level, generally on the order of about 0.5 volt. This output is applied to the base of the transistor 70 which functions as an emitter follower causing the voltage at the emitter of the transistor 70 to be negative. This negative voltage is applied to the diode 75 and blocked thereby so that the field effect transistor 76 is turned on.

When a voltage of positive polarity is applied by the thyristor bridge control system 20 to the fault protection module 37, it is blocked by the diode 52 and applied through the diode 50 to the input terminal of the amplifier 51. This positive voltage is combined with the negative biasing voltage applied through the resistor 55 and produces a net positive input voltage for the amplifier 51 which attempts to drive the output of the amplifier 51 negative. The poling of the diode 57, however, clamps the output voltage of the amplifier 51 at a very low negative value, generally at about 0.5 volt, which back biases the transistor 62 and turns it off. This causes a positive voltage to be applied through the resistor 64, conductor 65, and diode 66 to the gate of the field effect transistor 67 turning it off.

If a voltage of negative polarity is applied by the thyristor bridge control system 20 to the fault protection module 37, this voltage is blocked by the diode 50 and applied through the diode 52 to the input terminal of the amplifier 54. This voltage is combined with the positive biasing voltage applied through the resistor 56 to provide a net negative input voltage for the amplifier 54 which drives the output of the amplifier positive. This positive voltage is applied to the base of the emitter follower transistor 70 so that a positive voltage is applied through the conductor 72, the resistor 74 and the diode 75 to the gate of the field effect transistor 76, turning it off.

The input voltage supplied by the gate pulse suppression circuit 41 through the conductors 40 to the fault protection module 37 provides a biasing voltage through the diode 89 and the conductor 87 and through the resistors 85 and 86 to the bases of the transistors 82 and 84, respectively. This biasing voltage causes the transistor 82 and the transistor 84 to conduct and prevents the charging of the capacitors 111 and 122, respectively. In addition to the biasing voltage provided by the gate pulse suppression circuit 41, each field effect transistor, when it is turned on, applies a biasing voltage to the base of its associated transistor which causes it to conduct. When the field effect transistor 67 is turned on, the transistor 82 remains in a conducting condition; when the field effect transistor 76 is turned on, the transistor 84 remains in a conducting condition.

Should the biasing voltage be removed from the base of the transistor 82 so that it turns off, a voltage is placed across the capacitor 111 which charges the capacitor to the breakover voltage of the unilateral switch 109 to fire the thyristor 110. This discharges the capacitor 96 through the transformer primary winding 100p to cause the transformer secondary winding 100s to produce a voltage pulse which is applied to the reverse protective thyristor 30 through the conductors 36. Similarly, should the biasing voltage be removed from the base of the transistor 84 so that it turns off, a voltage is placed across the capacitor 122 which charges the capacitor to the breakover voltage of the unilateral switch 120 to fire the thyristor 121, which discharges the capacitor 96 through the transformer primary winding 101p to cause the transformer secondary winding 101s to produce a voltage pulse which is applied to the forward protective thyristor 26 through the conductors 35.

When regenerative operation of the armature 11 is being controlled by the forward bridge 14, a negative voltage is applied to the fault protection module 37 through the conductor 39, as has been previously indicated. This negative voltage is applied to the amplifier 54 and causes the field effect transistor 76 to turn off. Operation of the amplifier 51 with only the negative input voltage through the resistor 55 permits the field effect transistor 67 to remain on.

Upon occurrence of a line failure, the gate pulse suppression circuit 41 stops supply power to the thyristor bridge firing circuits in the thyristor bridge control system 20, through the conductor 42, and turns off power to the fault protection module 37 through the conductors 40. This removes the biasing voltage which had been applied through the diode 89 to the transistors 82 and 84. Because the field effect transistor 67 is still in a conducting state, the transistor 82 remains biased on and the capacitor 111 is not charged. However, because the field effect transistor 76 is turned off, the transistor 84 shuts off upon removal of this source of biasing voltage.

Upon the termination of conduction of the transistor 84, the capacitor 122 charges to the breakover voltage of the unilateral switch 120. This charging provides a time delay which ensures that the current through the then-conducting thyristors of the forward bridge 14 has dropped to the magnetizing current of the transformer 46. Upon breakover of the unilateral switch 120, the thyristor 121 fires, discharging the capacitor 96 through the transformer primary winding 101p and gating on the forward protective thyristor 26. Conduction of the forward protective thyristor 26 permits the then-conducting thyristors of the forward bridge 14 to reset, as has already been described.

During regenerative operation of the armature 11 controlled by the reverse bridge 15, a positive voltage is applied via the diode 50 to the input terminal of the amplifier 51 while the amplifier 54 has only the positive input biasing voltage supplied through the resistor 56 so that the field effect transistor 67 is turned off and the field effect transistor 76 is turned on. Upon occurrence of a line failure, all biasing voltage is removed from the base of the transistor 82 while the transistor 84 is still biased on through the field effect transistor 76. Upon termination of conduction of the transistor 82, the capacitor 111 is charged to the breakover voltage of the unilateral switch 109 to provide the required time delay before the thyristor 110 is turned on to discharge the capacitor 96 through the transformer primary winding 100p and fire the reverse protective thyristor 30 to permit the then-conducting thyristors of the reverse bridge 15 to reset in the manner previously described.

Should a line failure occur while the motor is operating in a non-regenerative mode, the fault protection module 37 will still operate to fire either the forward protective thyristor 26 or the reverse protective thyristor 30. However, because the motor is not in a regenerative mode, no fault can occur as a result of the line failure and, accordingly, no damage will be caused by the firing of the thyristor.

We claim:

1. In a regenerative motor control system comprising a direct current motor, a source of alternating voltage, converter means connected to the source of alternating voltage for controlling energization of the motor, firing means for supplying firing pulses to said converter means, and means operative upon occurrence of a line failure for terminating said firing pulses, the improvement comprising protection means operative upon occurrence of a line failure for diverting current flow from said converter means.

2. A regenerative motor control system as in claim 1 wherein said protection means comprises energy storage means for supporting a voltage thereacross, switching means having a conducting condition for discharging said storage means, and control means operative upon occurrence of a line failure to switch said switching means to its conducting condition.

3. A regenerative motor control system as in claim 2 wherein said switching means comprises a thyristor having a gate, said energy storage means comprises a capacitor, and said protection means includes means serially connecting said thyristor and said capacitor across said motor.

4. In a regenerative motor control system comprising a direct current motor having an armature, a source of alternating voltage, a first converter means connected to the source of alternating voltage for controlling energization of the motor in one direction of rotation of the armature, a second converter means connected to the source of alternating voltage for controlling energization of the motor in an other direction of rotation of the armature, firing means for supplying firing pulses selectively to each of said first and second converter means, and means operative upon occurrence of a line failure for terminating said firing pulses, the improvement comprising a first protection means operative upon occurrence of a line fai'ure for diverting current flow from said first converter means, a second protection means operative upon occurrence of a line failure for diverting current flow from said second converter means, and control means for preventing operation of the first protection means during operation of the motor with the armature rotating in said other direction and preventing operation of the second protection means during operation of the motor with the armature rotating in said one direction.

5. A regenerative motor control system as in claim 4 wherein said first protection means comprises a first energy storage means and a first switching means serially connected across said motor, and said second protection means comprises a second energy storage means and a second switching means serially connected across said motor.

6. A regenerative motor control system as in cliam 5 wherein said first converter means conducts current through said motor in a first direction, said second converter means conducts current through said motor in a second direction, said first switching means comprises a first undirectional controlled conduction means aligned to conduct through said motor in said first direction and said second switching means comprises a second undirectional controlled conduction means aligned to conduct current through said motor in said second direction.

7. A method for protecting a regenerative motor control system, including a motor, converter means for controlling energization of the motor, and firing means for controlling operation of said converter means, from faults occurring due to a line failure, said method comprising the steps of charging a capacitor, causing said firing means to terminate operation of said converter means, and operating switching means to discharge the capacitor through the motor.

* * * * *

PO-1050
(5/69)

UNITED STATES PATENT OFFICE
CERTIFICATE OF CORRECTION

Patent No. 3,755,712                Dated August 28, 1973

Inventor(s) Terrence E. DeViney and Robert P. Brennan

It is certified that error appears in the above-identified patent and that said Letters Patent are hereby corrected as shown below:

Col. 6, line 9, cancel "aramture" and insert --armature--; lines 14 and 17, cancel "applied" and insert --applies--.

Col. 8, lines 41-50, cancel "1. In a regenerative motor control system comprising a direct current motor, a source of alternating voltage, converter means connected to the source of alternating voltage for controlling energization of the motor, firing means for supplying firing pulses to said converter means, and means operative upon occurrence of a line failure for terminating said firing pulses, the improvement comprising protection means operative upon occurrence of a line failure for diverting current flow from said converter means." and insert --1. In a regenerative motor control system comprising a direct current motor, a source of alternating voltage, converter means connected to the source of alternating voltage for controlling energization of the motor, firing means for supplying firing pulses to said converter means, the means operative upon occurrence of a line failure for terminating said firing pulses, the improvement comprising protection means operative upon occurrence of a line failure while the motor is operating in a regenerative mode for diverting, from said converter means, current flowing from said motor.--

Signed and sealed this 18th day of December 1973.

(SEAL)
Attest:

EDWARD M. FLETCHER, JR.        RENE D. TEGTMEYER
Attesting Officer              Acting Commissioner of Patents